(12) United States Patent
Samuelson

(10) Patent No.: US 6,178,877 B1
(45) Date of Patent: Jan. 30, 2001

(54) PORTABLE ROASTER

(76) Inventor: Karl Samuelson, 1503 First St. NW., Albuquerque, NM (US) 87102

( * ) Notice: Under 35 U.S.C. 154(b), the term of this patent shall be extended for 0 days.

(21) Appl. No.: 09/378,245

(22) Filed: Aug. 19, 1999

Related U.S. Application Data

(60) Provisional application No. 60/097,134, filed on Aug. 19, 1998.

(51) Int. Cl.[7] .............. A47J 37/00; A47J 37/04; A47J 37/08; A47J 37/10; A47J 43/18
(52) U.S. Cl. .................. 99/340; 99/394; 99/395; 99/419; 99/421 H; 99/427; 99/449; 99/450; 126/9 R; 126/25 R; 126/30
(58) Field of Search .............. 99/337, 338, 340, 99/339, 393–399, 400, 401, 419–421 V, 426, 427, 444–450, 482; 126/25 R, 9 B, 9 R, 30; 34/63, 68, 95; 219/400, 389; 426/243, 519, 523; D7/361, 409; 248/165, 168, 170, 163.2

(56) References Cited

U.S. PATENT DOCUMENTS

| | | | |
|---|---|---|---|
| 3,126,814 | * 3/1964 | Brown | 99/421 H |
| 4,982,657 | * 1/1991 | Ghenic | 99/419 X |
| 5,172,628 | * 12/1992 | Pillsbury et al. | 99/421 A |
| 5,184,540 | * 2/1993 | Riccio | 126/25 R |
| 5,361,686 | * 11/1994 | Koopman | 99/446 X |
| 5,367,950 | * 11/1994 | Sarich | 99/449 X |
| 5,421,318 | * 6/1995 | Unruh et al. | 126/9 R |
| 5,485,780 | * 1/1996 | Koether et al. | 219/400 X |
| 5,562,022 | * 10/1996 | Schmid et al. | 99/419 X |
| 5,715,744 | * 2/1998 | Coutant | 99/421 R |
| 5,799,569 | * 9/1998 | Moreth | 99/446 X |
| 5,819,639 | * 10/1998 | Spell | 99/419 X |
| 5,887,513 | * 3/1999 | Fielding et al. | 99/421 H |

* cited by examiner

*Primary Examiner*—Timothy Simone
(74) *Attorney, Agent, or Firm*—Joseph Barrera; Jeffrey D. Myers

(57) ABSTRACT

A portable roaster having a drum that is rotated either by hand or by a motor and able to roast a variety of items including fruits and vegetables, nuts, meats and seafood depending on the type of roaster drum or drum attachment used.

15 Claims, 3 Drawing Sheets

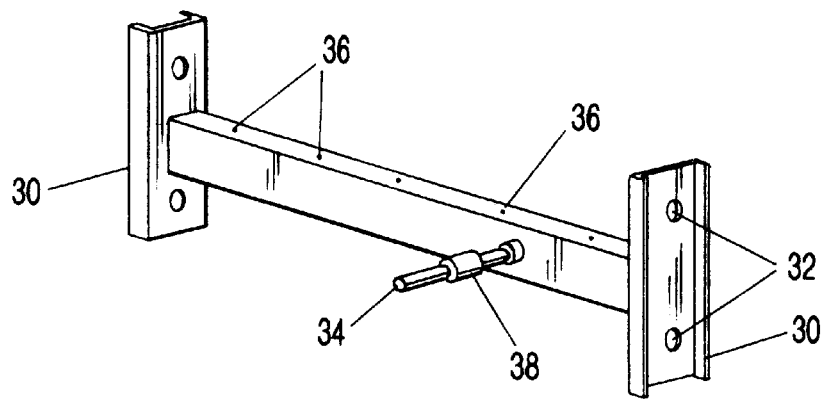
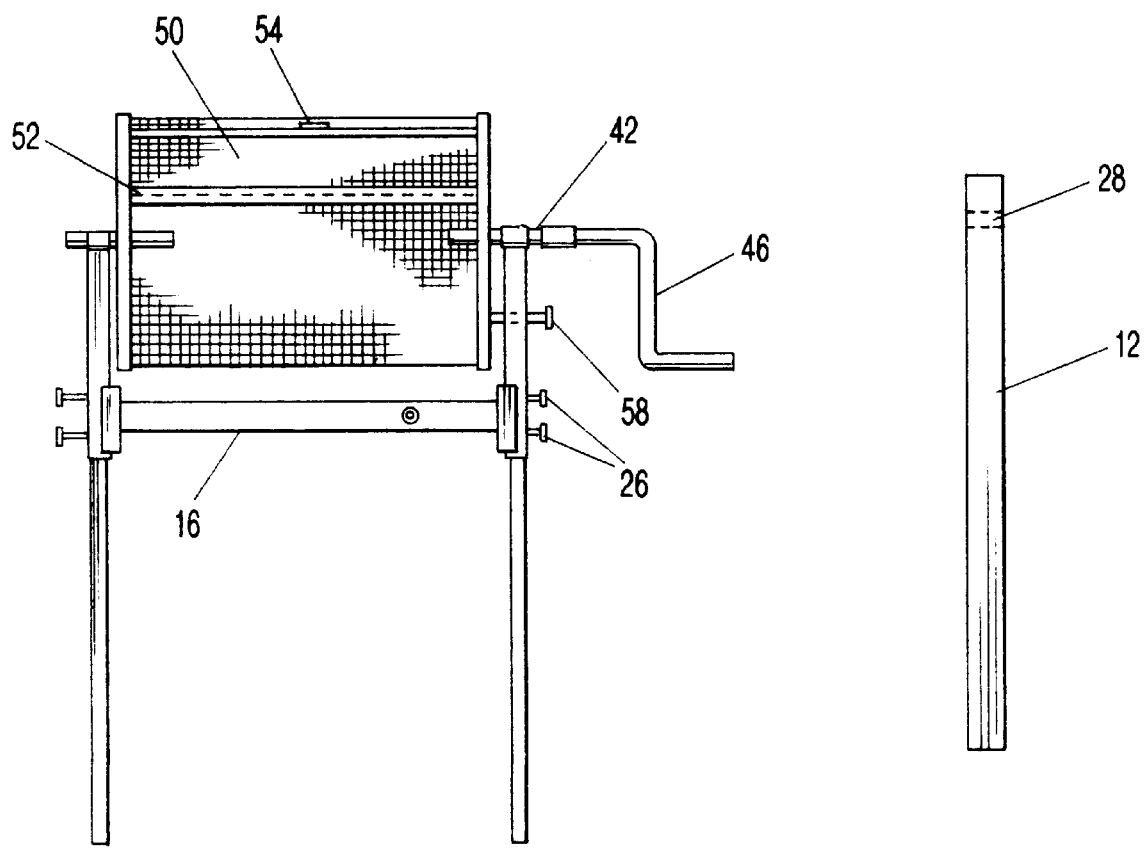
FIG-3
FIG-4
FIG-5

PORTABLE ROASTER

This application claims the benefit of U.S. provisional application Serial No. 60/097,134, Aug. 19, 1998.

BACKGROUND OF THE INVENTION

1. Field of the Invention (Technical Field)

The present invention relates to a food roasting apparatus, particularly those that are portable.

2. Background Art

Commercial roasters have been used for many years to roast a variety of foods. For example, during the late summer in New Mexico, commercial roasters occupy parking lots of nearly every large supermarket to roast thousands of pounds of green chile for every customer who purchases a 35 pound sack. Some customers exit the market with three or four 35 pound sacks, which they then take home to clean and freeze for use throughout the year. At state fairs and ballparks corn roasters are now a common sight. However, in spite of the growing and widespread use of roasters there exists the need for an alternative to the large commercial roasters. Such alternative must be portable and easy to assemble so consumers in their own backyard can roast a variety of food items in much the same way consumers presently use the barbecue grill. The present invention provides such a solution.

SUMMARY OF THE INVENTION
(DISCLOSURE OF THE INVENTION)

The present invention is of a portable apparatus for roasting that is easily assembled and disassembled, comprising: two frames with frame legs and support for a roasting drum; a cylindrical shaft attached to either end of the roasting drum and supported by the two frames; a burner bar having a plurality of orifices and connectivity to a gas source allowing a plurality of open flames to be directed toward the roasting drum; reversibly attachment between the burner bar and the two frames; and rotatability of the roasting drum. In the preferred embodiment, the frames have adjustable legs, and the frame and the frame legs are reversibly attachable with respect to one another through a plurality of selectively located holes and placement of securing pins or bolts through the holes to secure the frame to the frame legs. The frame is preferably an A-frame and the frame legs are inserted into the bottom portion of the A-frame until the selectively located holes coincide, both the A-frame and the frame legs comprising metal tubing. The A-frame preferably includes a metal tube attached to the top of the A-frame and with an opening perpendicular to the face of the A-Frame, through which the cylindrical shaft passes and rotates. The burner bar is welded and sealed at each end to an open metal channel, the channel has at least two selectively located holes that coincide with selectively located holes in the frame and the frame legs, through which bolts are placed to secure the frame to the frame legs and the burner bar. The roaster drum comprises two metal end plates with the cylindrical shafts attached to either face of each the end plate, metal mesh attached to each the end plate, and item loading and unloading access for items to be roasted through a hinged door that is secured by a latch and located on the wire mesh portion of the roaster drum. A layer of sheet metal may be supported by the metal mesh of the roaster drum for use for smaller items or to create an oven. A slide tray may be employed, angled downward, that catches previously roasted items beneath the roaster and directs the items away from the roaster drum and flame. The roaster drum preferably has two metal end plates with the cylindrical shafts attached to either face of each the end plate and threaded on each free end, and attachability of optional attachments to the threaded portions of the cylindrical shafts located within the roasting drum. Power may be provided for rotation of the roaster drum through attachment of a hand crank to at least one of the threaded portion of the cylindrical shafts exterior to the roaster drum, or via attachment of a motor drive. One or more cylindrical baffles may be used to divide the roasting drum into separate roasting compartments. A secondary metal mesh drum that fits within the roaster drum may also be used.

The present invention gives consumers the opportunity to roast a variety of food items, such as vegetables, fruits, meats or seafood in their own backyards or on their apartment balcony. For example, the invention is quite useful for roasting chilies on an as needed basis. The consumer no longer has to devote considerable amounts of freezer space to the annual supply of chile. Instead, the invention can be assembled in a matter of minutes, connected to a portable gas supply, and within minutes the cook has a sufficient supply of roasted peppers, tomatoes, eggplant, or chestnuts to feed friends and family. Furthermore, when the invention is not being used, the invention can be disassembled in a matter of minutes and stored in a box no more then 12×12× 30 inches in dimension.

A primary object of the present invention is provide a consumer size, portable roaster.

A primary advantage of the present invention is the ease at which the roaster is assembled and disassembled.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3 is a representation of the burner bar and the gas line attachment;

FIG. 4 is a front view representation of the assembled crank handle roaster with piano hinge and locking latch;

FIG. 5 is a side representation of a leg for the roaster;

DESCRIPTION OF THE PREFERRED EMBODIMENTS

BEST MODES FOR CARRYING OUT THE INVENTION

Figure 1:
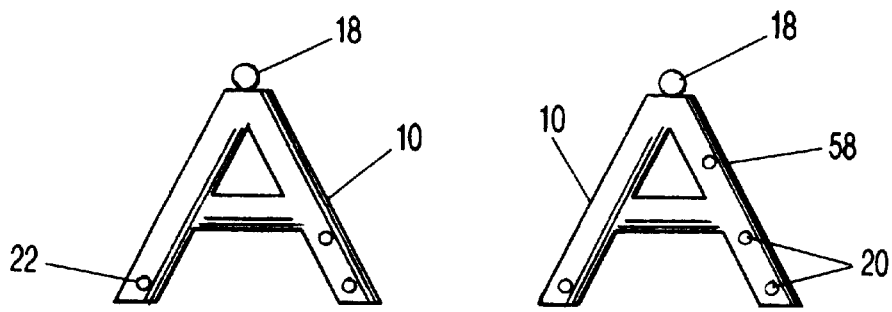
FIG. 1 is a representation of the A-frames that are used to support the roasting drum of the invention.
Figure 2:
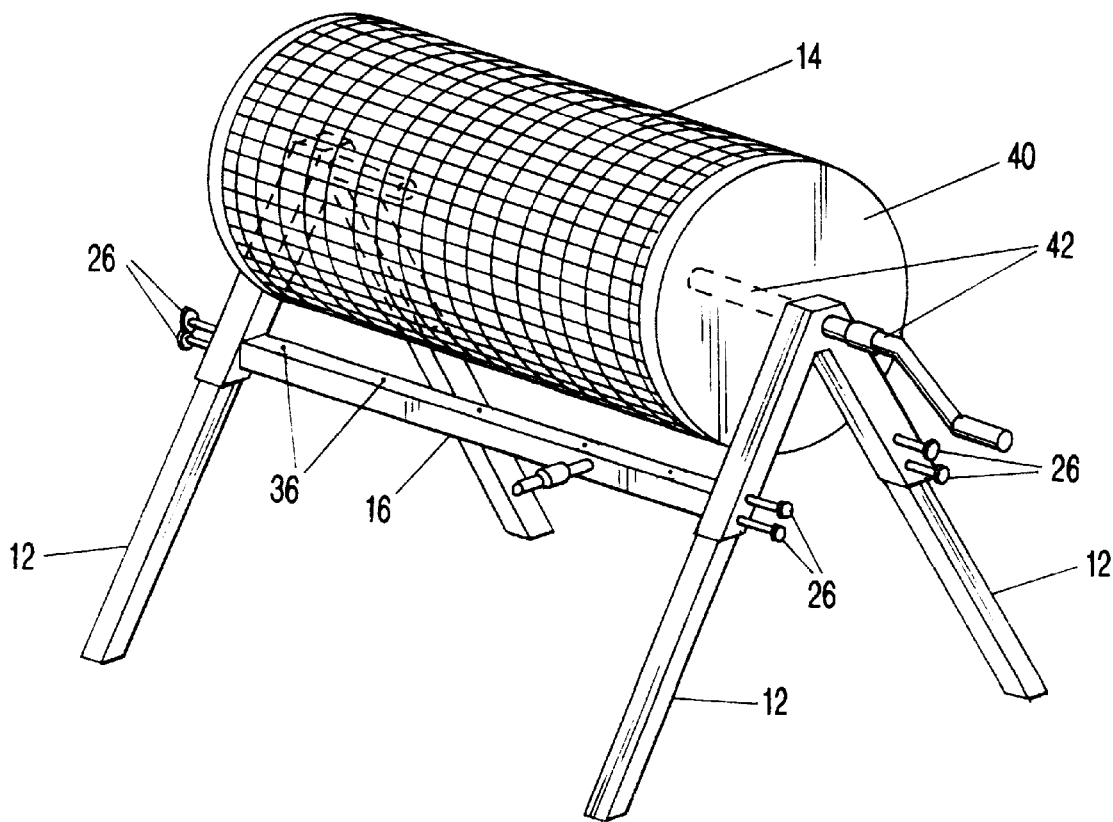
FIG. 2 is a perspective representation of the assembled roaster with crank handle.

The portable roaster of the invention completely breaks down, preferably, into eight separate pieces for portability;

two A-frames 10, four legs 12, one roaster drum 14, and one burner bar 16. The Two A-frames 10 comprise metal tubing and a second piece of metal tubing 18 attached to top of the "A", so that the center line of the tubing is perpendicular to the A-frame as shown in FIG. 1. The A-Frames also have at least two holes 20 on one leg of the A-frame and at least one hole 22 on the other leg. The holes are used to secure the A-frames to the attachable legs 12 of the roaster as well as the burner bar by placing bolts 26 through the holes 20 and 22 and securing them with a washer and a nut or wing-nut as shown in FIGS. 2 and 4. The four legs 12 comprise metal tubing as shown in FIG. 5. When assembled at least one hole 28 in each leg coincides with a hole in each leg of the "A" frames. The legs 12 align with the bottoms of each leg of the "A" frames until the holes 28 of each leg and the holes 20 and 22 of the A-frame coincide.

The burner bar 16 comprises metal tubing with an open metal channel 30 attached to each end of the burner bar 16, FIG. 3. Each channel has at least one two hole 32. When assembled at least one of these holes 32 coincide with a leg hole 28. When assembled the channel hole 32 coincides with the at least on of the holes 20 in each "A" frame. With the channel hole 32 coinciding with the corresponding hole 20 in each of the two "A" frames, bolts are inserted in each hole and secured with a flat washer and a wing nut that is tightened by hand to form a three-piece support for the roaster drum, FIG. 2. The burner bar has a plurality of small orifices 36 facing the roaster drum when the roaster is assembled. The roasting flame protrudes out from these orifices. Also, the burner bar on a surface that faces approximately 90° away from the roaster drum and the small orifices 36 is a coupling 38 attached to the burner bar. The coupling allows the fuel to enter the burner bar when the fuel valve 34 located at the opposite end of the coupling is opened.

The roaster drum comprises two end plates 40, two cylindrical shafts 42, and metal mesh 44, FIGS. 2 and 4. Each end plate 40 has a flange that is used to help secure and support the metal mesh 44 that is attached to the end plates 40. The flange is used to help secure and support the metal mesh 44 that is attached to the end plates 40. Each end plate has a cylindrical shaft 42 protruding from each side of the plate. The end of each shaft 42 is optionally threaded 48. The threads 48 on the shaft within the drum are used to secure other roasting or heating accessories. The threads 48 exterior to the drum may be used to attach a crank handle 46, or alternatively a pulley-motor unit, to either end of the drum, thus allowing the drum to be rotated during roasting. The two end plates 40 are connected by the metal mesh 44. The metal mesh 44 is supported or attached to the flange on each end plate. The roaster drum also comprises a hinged door means 50 to place vegetables, nuts, or any food item to be roasted into the drum and then removed. In the preferred embodiment, the door extends the length of the drum and is connected to the metal mesh 44 by a piano hinge 52. A closing latch 54 is also secured to the drum so the door may be secured while the roaster drum is rotated, FIG. 4. At least one of the end plates also comprises a hole 56 that coincides with an additional hole on one of the A-frames 58 when the roaster is assembled. The two holes in combination with a securing pin 60 secures, i.e., prevents the drum from rotating, the roaster drum as items are placed into or removed from the roaster.

In another embodiment, the two A-frames 10 comprise metal tubing and a second piece of metal tubing 18 welded to top of the "A", so that the center line of the tubing is perpendicular to the A-frame as shown in FIG. 1. The four legs 12 comprise square or rectangular metal tubing as shown in FIG. 5. The legs may also comprise movable feet attached to bottom of each leg to better support the assembled roaster on uneven ground. The legs 12 are inserted into the open bottoms of each leg of the "A" frames until the holes 28 of each leg and the holes 20 and 22 of the A-frame coincide.

The burner bar 16 comprises metal tubing with an open metal channel 30 welded and properly sealed to each end of the burner bar 16, FIG. 3. Each channel has two holes 32. When assembled at least one of these holes 32 coincide with a leg hole 28. When assembled both of the channel holes 32 coincide with the two holes 20 in the one leg of each "A" frame. With the channel holes 32 coinciding with the corresponding holes 20 in each of the two "A" frames, bolts are inserted in each hole and secured with a flat washer and a wing nut that is tightened by hand to form a three-piece support for the roaster drum, FIG. 2. The burner bar has a plurality of small orifices 36 in one side of the square or rectangular tubing that is facing the roaster drum when the roaster is assembled. Also, at approximately one end of the burner bar on the surface that faces approximately 90° away from the roaster drum and the small orifices 36 is a coupling 38 welded and properly sealed to the burner bar. The coupling allows the fuel to enter the burner bar when the fuel ball or needle valve 34 located at the opposite end of the coupling is opened.

The roaster drum comprises two end plates 40, two cylindrical shafts 42, and metal mesh 44, FIGS. 2 and 4. Each end plate 40 has a flange formed to an approximately 90° angle about the circumference, and a cylindrical shaft 42 protruding from each side of the plate. The end of each shaft 42 is optionally threaded 48. The threads 48 on the shaft within the drum are used to secure other roasting or heating accessories. The threads 48 exterior to the drum may be used to attach a crank handle 46, or alternatively a pulley-motor unit, to either end of the drum, thus allowing the drum to be rotated during roasting. The metal mesh 44 is supported by and welded to the flange on each end plate. The roaster drum also comprises a hinged door means 50 to place vegetables, nuts, or any food item to be roasted into the drum and then removed. In the preferred embodiment, the door extends the length of the drum and is connected to the metal mesh 44 by a piano hinge 52. A closing latch 54 is also secured to the drum so the door may be secured while the roaster drum is rotated, FIG. 4.

Figure 6A:
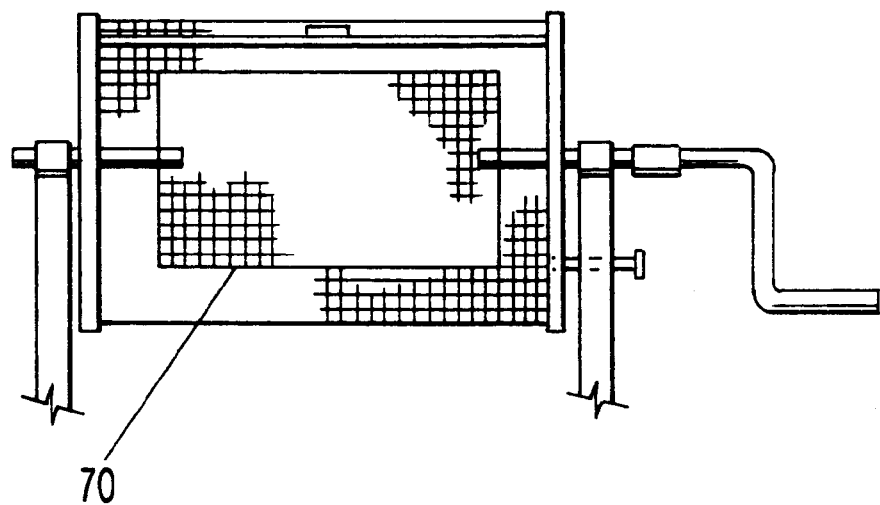
FIG. 6A is a representation of the optional secondary roaster drum that may be used with the invention.
Figure 6B:
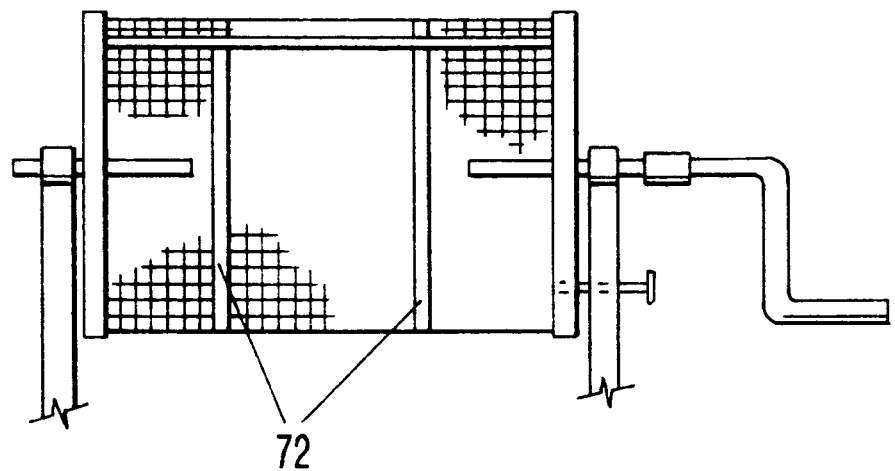
FIG. 6B is a representation of the optional baffles that may be used with the invention

The accessories that can be optionally added to the portable roaster for convenience and versatility are discussed below. A secondary metal mesh drum can be added to the end of one or both the interior threaded shafts within the roaster drum, FIG. 6A. This will allow the user to adjust the distance between the vegetables and the open flame, or will allow certain vegetables to be separated from one another during roasting. Vegetables may also be segregated within the roaster drum by using cylindrical baffles or end walls connected to the interior shafts, FIG. 6B. This allows the roaster drum to be divided into three distinct roaster drums during roasting. The roasting drum may also be designed to roast small items such as chestnuts or pinon nuts by adjusting the size of the metal mesh or by converting the roaster into and oven with a layer of sheet metal supported by the original metal mesh. The roaster can also be supplied with a sliding tray that catches the previously roasted items beneath the roaster as the door is opened and directs the items away from the flame.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A portable apparatus for roasting that is easily assembled and disassembled, said apparatus comprising:

two frames with frame legs and means to support a roasting drum;

a cylindrical shaft attached to either end of said roasting drum and supported by said two frames;

a burner bar having a plurality of orifices and means to connect to a gas source allowing a plurality of open flames to be directed toward said roasting drum;

means to reversibly attach said burner bar to said two frames; and means to rotate said roasting drum.

2. The roasting apparatus according to claim 1 wherein said frames further comprise adjustable legs.

3. The roasting apparatus according to claim 1 wherein said frame and said frame legs are reversibly attachable with respect to one another through a plurality of selectively located holes and placement of securing pins through said holes to secure said frame to said frame legs.

4. The roasting apparatus according to claim 1 wherein said frames and said frame legs are reversibly attachable with respect to one another through a plurality of selectively located holes and placement of bolts through said holes to secure said frame to said frame legs.

5. The roasting apparatus according to claim 4 wherein said frame is an A-frame and said frame legs are inserted into a bottom portion of said A-frame until said selectively located holes coincide, both said A-frame and said frame legs comprising metal tubing.

6. The roasting apparatus according to claim 5 wherein said A-frame further comprises a metal tube attached to a top of said A-frame and with an opening perpendicular to a face of said A-Frame, through which said cylindrical shaft passes and rotates.

7. The roasting apparatus according to claim 1 wherein said burner bar is welded and sealed at each end of said burner bar to an open metal channel, said channel has at least two selectively located holes that coincide with selectively located holes in said frame and said frame legs, through which bolts are placed to secure said frame to said frame legs and said burner bar.

8. The roasting apparatus according to claim 1 wherein said roaster drum comprises two metal end plates with said cylindrical shafts attached to either face of each said end plate, metal mesh attached to each said end plate, and means to load and unload items to be roasted through a hinged door that is secured by a latch and located on said wire mesh portion of said roaster drum.

9. The apparatus according to claim 1 further comprising a layer of sheet metal that is supported by said metal mesh of said roaster drum.

10. The apparatus according to claim 1 further comprising a slide tray angled downward that catches previously roasted items beneath said roaster and directs said items away from said roaster drum and flame.

11. The roasting apparatus according to claim 1 wherein said roaster drum comprises two metal end plates with said cylindrical shafts attached to either face of each said end plate and threaded on each free end, and means to add optional attachments to said threaded portions of said cylindrical shafts located within said roasting drum.

12. The apparatus according to claim 11 further comprising means to power rotation of said roaster drum through attachment of a hand crank to at least one of said threaded portion of said cylindrical shafts exterior to said roaster drum.

13. The apparatus according to claim 11 further comprising means to power rotation of said roaster drum through attachment of a motor drive to at least one of said threaded portion of said cylindrical shafts exterior to said roaster drum.

14. The apparatus according to claim 11 additionally comprising an attachment comprising a cylindrical baffle that divides said roasting drum into at least two separate roasting compartments.

15. The apparatus according to claim 11 additionally comprising an attachment comprising a secondary metal mesh drum that fits within said roaster drum.

* * * * *